(12) United States Patent
Laughlin et al.

(10) Patent No.: US 12,732,240 B2
(45) Date of Patent: Sep. 8, 2026

(54) MIMO INTERFERENCE CANCELLATION

(71) Applicant: Forefront RF Ltd, Cambridge (GB)

(72) Inventors: Leo Laughlin, Cambridge (GB); John Leslie Haine, Cambridge (GB)

(73) Assignee: Forefront RF Ltd, Cambridge (GB)

( * ) Notice: Subject to any disclaimer, the term of this patent is extended or adjusted under 35 U.S.C. 154(b) by 90 days.

(21) Appl. No.: 18/696,792

(22) PCT Filed: Sep. 29, 2022

(86) PCT No.: PCT/EP2022/077156

§ 371 (c)(1),
(2) Date: Sep. 23, 2024

(87) PCT Pub. No.: WO2023/052528

PCT Pub. Date: Apr. 6, 2023

(65) Prior Publication Data

US 2024/0396600 A1 Nov. 28, 2024

(30) Foreign Application Priority Data

Sep. 29, 2021 (GB) ...................................... 2113905

(51) Int. Cl.
*H04B 7/0456* (2017.01)
*H04B 1/44* (2006.01)
*H04B 17/345* (2015.01)

(52) U.S. Cl.
CPC ............... *H04B 7/046* (2013.01); *H04B 1/44* (2013.01); *H04B 17/345* (2015.01)

(58) Field of Classification Search
CPC ........ H04B 7/046; H04B 1/44; H04B 17/345; H04B 1/525; H04B 1/56; H04B 7/015;
(Continued)

(56) References Cited

U.S. PATENT DOCUMENTS

2016/0119019 A1* 4/2016 Pratt ....................... H04W 4/70 370/278
2021/0006285 A1 1/2021 Kumar et al.

OTHER PUBLICATIONS

International Search Report and Written Opinion of PCT/EP2022/077156, Dec. 8, 2022, 16 pages.

(Continued)

*Primary Examiner* — Fitwi Y Hailegiorgis
(74) *Attorney, Agent, or Firm* — Ryan, Mason & Lewis, LLP

(57) ABSTRACT

A multiple input, multiple output, MIMO, antenna arrangement comprising: a transmit hybrid circuit connected to receive first and second transmit signals, and to output a sum of the first and second transmit signals, and to output a difference of the first and second transmit signals, a first antenna connected to receive the output sum; a second antenna connected to receive the output difference; a receive hybrid circuit connected to receive signals from the first and second antennas, and to output a sum of the signals from the first and second antennas, and to output a difference of the first and second antenna signals; a first cancellation circuit connected to receive the first transmit signal and configured to compensate for the interference due to the first transmit path; a second cancellation circuit connected to receive the second transmit signal and configured to compensate for the interference due to the second transmit path; wherein: the sum output of the receive hybrid circuit and the output of the first cancellation circuit are combined to generate a first receive signal; and the difference output of the receive hybrid circuit and the output of the second cancellation circuit are combined to generate a second receive signal.

20 Claims, 8 Drawing Sheets

(58) Field of Classification Search
CPC .. H04B 7/0413; H04B 1/0064; H04B 1/0458; H04B 1/18; H04L 5/14; H03F 2200/294
USPC .......................................................... 375/224
See application file for complete search history.

(56) References Cited

OTHER PUBLICATIONS

United Kingdom Search Report of GB2113905.0, Jun. 27, 2022, 3 pages.
A. Kumar et al., "A 2.35 GHz Cross-Talk Canceller for 2×2 MIMO Full-Duplex Wireless System," 2019 IEEE MTT-S International Microwave Symposium (IMS), Jun. 2019, pp. 877-880.

* cited by examiner

LNA
LNA
$30_1$
$30_2$
$R_{x1}$
$R_{x2}$
29
31
Σ
Δ
28
Rx
Rx
$26_1$
$26_2$
$10_1$
$10_2$
Tx
Tx
$24_1$
$24_2$
23
25
Σ
Δ
22
$T_{x1}$
$T_{x2}$
PA
PA
$20_1$
$20_2$ $20_1$
$20_2$
PA
PA
$T_{x1}$
$T_{x2}$
22
Σ
Δ
23
25
$\frac{T_{x1}+T_{x2}}{\sqrt{2}}$
$\frac{T_{x1}-T_{x2}}{\sqrt{2}}$
A
C
$24_1$
$24_2$
$A\frac{(T_{x1}+T_{x2})}{\sqrt{2}}$
$C\frac{(T_{x1}-T_{x2})}{\sqrt{2}}$
X
21
$\frac{(T_{x1}+T_{x2})}{\sqrt{2}}+CX\frac{(T_{x1}-T_{x2})}{\sqrt{2}}$
$\frac{(T_{x1}-T_{x2})}{\sqrt{2}}+AX\frac{(T_{x1}+T_{x2})}{\sqrt{2}}$
B
D
$26_1$
$26_2$
$BA\frac{(T_{x1}+T_{x2})}{\sqrt{2}}+BCX\frac{(T_{x1}-T_{x2})}{\sqrt{2}}$
$DC\frac{(T_{x1}-T_{x2})}{\sqrt{2}}+DAX\frac{(T_{x1}+T_{x}}{\sqrt{2}}$
28
Σ
Δ
29
31
$R_{x1}$
$R_{x2}$
LNA
LNA
$30_1$
$30_2$

LNA
LNA

Canceller
Canceller
Rx
Rx
Tx
Tx
PA
PA
Σ
Δ
Σ
Δ
+
+

LNA
LNA
Σ
Δ
Σ
Δ
Canceller
Canceller
PA
PA

LNA
LNA
Rx1
Rx2
Σ
Δ
180°
180°
Tx
Tx
Rx
Rx
Σ
Δ
PA
PA
Tx1
Tx2

82_2
82_3
80_2
80_1
80_3
80_4
180°
81
82_1
82_4

MIMO INTERFERENCE CANCELLATION

FIELD OF THE INVENTION

The present invention is related to methods and apparatus for suppressing interference between receive paths and transmit paths in multiple-input, multiple-output (MIMO) antenna arrangements. The invention is particularly but not exclusively concerned with the implementation of MIMO in radio frequency (RF) technology, such as mobile technology.

BACKGROUND TO THE INVENTION

A feature of wireless communication equipment is the ability to transmit and receive wireless signals at the same time using multiple antennas, known as multiple-input, multiple-output (MIMO). MIMO is a method for multiplying the capacity of a radio link using multiple transmitting and receiving antennas to exploit multi-path propagation.

Simultaneously transmitting and receiving wireless signals in a MIMO arrangement leads to a problem wherein the relatively high-powered signal transmitted from each transmitter is coupled to each receiver where it can provide an interference signal to obscure a relatively low-powered signal which is desired to be received. Thus, a MIMO arrangement is typically required to suppress interference at or before one or more receivers in order to enable successful reception in the presence of transmission at multiple antennas.

With reference to FIG. 1 there is illustrated an exemplary MIMO arrangement including two antennas, for transmitting first and second transmit signals $T_{x1}$ and $T_{x2}$ and for receiving first and second receive signals $R_{x1}$ and $R_{x2}$ using first and second antennas $\mathbf{10}_1$ and $\mathbf{10}_2$ respectively. A first circulator $\mathbf{12}_1$ is connected to the first antenna $\mathbf{10}_1$, receives the first transmit signal $T_{x1}$, and outputs the first receive signal $R_{x1}$. A second circulator $\mathbf{12}_2$ is connected to the second antenna $\mathbf{10}_2$, receives the second transmit signal $T_{x2}$, and outputs the second receive signal $R_{x2}$.

In this example MIMO arrangement, there are four paths of interference from the transmit paths to the receive paths through the circulators: a path denoted by arrow $\mathbf{17}_{11}$ from the first transmit signal $T_{x1}$ path to the first receive signal $R_{x1}$ path; a path denoted by arrow $\mathbf{17}_{12}$ from the first transmit signal $T_{x1}$ path to the second receive signal $R_{x2}$ path; a path denoted by arrow $\mathbf{17}_{22}$ from the second transmit signal $T_{x2}$ path to the second receive signal $R_{x2}$ path; and a path denoted by arrow $\mathbf{17}_{21}$ from the second transmit signal $T_{x2}$ path to the first receive signal $R_{x1}$ path.

To minimise this interference, cancellers may be provided. The output of each of the first and second circulators $\mathbf{12}_1$ and $\mathbf{12}_2$ is connected to a respective combiner $\mathbf{14}_1$ and $\mathbf{14}_2$, and then each of the combiners $\mathbf{14}_1$ and $\mathbf{14}_2$ additionally receives the outputs of two of the cancellers.

A canceller $\mathbf{16}_{11}$ is connected between the first transmit signal path $T_{x1}$ and the first combiner $\mathbf{14}_1$, a canceller $\mathbf{16}_{12}$ is connected between the first transmit signal path $T_{x1}$ and the second combiner $\mathbf{14}_2$, a canceller $\mathbf{16}_{22}$ is connected between the second transmit signal path $T_{x2}$ and the second combiner $\mathbf{14}_2$, and canceller $\mathbf{16}_{21}$ is connected between the second transmit signal path $T_{x2}$ and the first combiner $\mathbf{14}_1$.

Thus a canceller is provided to compensate for each interference path. In general, the number of interference paths is the product of the number of transmit channels and the number of receive channels. Thus in general the number of canceller circuits required is equal to the product of the number of transmitters and the number of receivers. The number of cancelers required in an n-stage MIMO is therefore $n^2$.

It is an aim of the invention to provide an improved technique for suppressing interference between a receive path and a transmit in a MIMO arrangement.

Statement of the Invention

There is provided a multiple input, multiple output, MIMO, antenna arrangement comprising: a transmit hybrid circuit connected to receive first and second transmit signals, and to output a sum of the first and second transmit signals, and to output a difference of the first and second transmit signals, a first antenna connected to receive the output sum; a second antenna connected to receive the output difference; a receive hybrid circuit connected to receive signals from the first and second antennas, and to output a sum of the signals from the first and second antennas, and to output a difference of the first and second antenna signals; a first cancellation circuit connected to receive the first transmit signal and configured to compensate for the interference due to the first transmit path; a second cancellation circuit connected to receive the second transmit signal and configured to compensate for the interference due to the second transmit path; wherein: the sum output of the receive hybrid circuit and the output of the first cancellation circuit are combined to generate a first receive signal; and the difference output of the receive hybrid circuit and the output of the second cancellation circuit are combined to generate a second receive signal.

The first canceller may cancel interference in the first receiver path which results from (which is due to) the first transmit path. The second canceller may cancel interference in the second receiver path which results from (which is due to) the second transmit path. This may be achieved when the transfer function of the respective canceller is the inverse of the transfer function from the first or second transmit path to the first or second receiver path. The transmit path may be the input to the transmit hybrid circuit, and the receive path may be the output of the receive hybrid circuit.

Each canceller may compensate for self-interference coupling components whish result from (are due to) cross-coupling of signals between the two antennas.

The transfer function of each cancellation path may have the inverse transfer function of a self-interference path, including any compensation for antenna cross-coupling. Compensation may be provided in tuneable circuits of each canceller.

Each of the first and second canceller circuits may include a phase inverter, wherein the first and second combiner combine the respective output of the receive hybrid circuit with the inverse output of the canceller circuit.

Each of the first and second canceller circuits may include a sub-canceller circuit for matching the impedance of the respective first and second antenna respectively.

The MIMO antenna arrangement may further comprise: a first transmit filter connected between the sum output of the transmit hybrid circuit and the first antenna; a second transmit filter connected between the difference output of the transmit hybrid circuit and the second antenna; a first receive filter connected between the first antenna and the receive hybrid circuit; and a second receive filter connected between the second antenna and the receive hybrid circuit.

The transmit hybrid circuit may include: a first transmit filter for filtering the sum output of the transmit hybrid circuit; a second transmit filter for filtering the difference output of the transmit hybrid circuit; and the receive hybrid circuit may include: a first receive filter for filtering the first antenna signal; and a second receive filter for filtering the second antenna signal.

The first and second transmit filters and the first and second receiver filters may be variable filters.

The first cancellation circuit may include: a first cancellation receive filter connected to receive the first transmit signal; and a first cancellation transmit filter connected to receive a signal from the first cancellation receive filter.

The second cancellation circuit may include: a second cancellation receive filter connected to receive the first transmit signal; and a second cancellation transmit filter connected to receive a signal from the second cancellation receive filter.

The first cancellation circuit may comprise a 180° phase shift circuit. The second cancellation circuit may include a 180° phase shift circuit.

The first and second cancellation transmit filters and the first and second cancellation receive filters may be variable filters.

The first transmit filter may match the first cancellation transmit filter, the second transmit filter may match the second cancellation transmit filter, the first receive filter may match the first cancellation receive filter, and the second receive filter may match the second cancellation receive filter.

Each cancellation circuit may include a sub-canceller connected between the respective cancellation transmit and cancellation receive filters. Each sub-canceller circuit may be a variable impedance circuit. The sub-canceller circuit may be adjustable to match the impedance of the respective first or second antenna. Each sub-canceller circuit may be adjustable to compensate for the interference in the respective transmit path.

The MIMO antenna arrangement may further comprise: a first circulator connecting the first antenna, the sum output of the transmit hybrid circuit, and an input to the receive hybrid circuit; and a second circulator connecting the second antenna, the difference output of the transmit hybrid circuit, and an input to the receive hybrid circuit.

The MIMO antenna arrangement may further comprise: a first power amplifier for providing the first transmit signal; and a second power amplifier for providing the second transit signal.

The MIMO antenna arrangement may further comprise: a first low noise amplifier for receiving the first receive signal; and a second low noise amplifier for receiving the second receiver signal.

There is provided a method of transmitting and receiving in a multiple input, multiple output, MIMO, antenna arrangement, the method comprising: receiving first and second transmit signals; outputting a sum of the first and second transmit signals to a first antenna; outputting a difference of the first and second transmit signals to a second antenna; receiving first and second signals from the first and second antennas in first and second receive paths; outputting a sum of the signals received from the first and second antennas; outputting a difference of the signals received from the first and second antenna signals; determining an interference in the first receive path due to the first transmit signal; determining an interference in the second receive path due the second transmit signal; combining the sum output of the signals received from the first and second antennas and an inverse of the determined interference in the first receive path due to the first transmit signal to generate a first received signal; and combining the difference output of the signals received from the first and second antennas and an inverse of the determined interference in the second receive path due to the second transmit signal to generate a second received signal.

The step of determining the interference in the first and second receive paths due to the respective first and second transmit signals may include matching the impedance of the respective first and second antennas respectively.

The method may further comprise: in a first filtering step filtering the sum output prior to the first antenna; in a second filtering step filtering the difference output prior to the second antenna; in a second filtering step filtering the signal received from the first antenna; and in a fourth filtering step filtering the signal received from the second antenna.

Determining an interference in the first receive path due to the first transmit signal may include applying filtering steps equivalent to the first and third filtering steps to the first transmit signal, and determining an interference in the second receive path due to the second transmit signal includes applying filtering steps equivalent to the second and fourth filtering steps to the second transmit signal.

The method may further comprise a 180° phase shift circuit to each of the determined interferences in the first receive path due to the first transmit signal and the second receive path due to the second transmit signal, or to each of the signals in the receive path.

There may be provided a method for providing the circuitry, or any part of the circuitry.

There may be provided a method for controlling any part of the circuitry.

There may be provided a computer program which when executed on a processor performs any part of the method.

There may be provided a computer program product for storing such code. The computer program product may be a non-transitory product.

BRIEF DESCRIPTION OF THE FIGURES

The invention is now described with reference to the accompanying drawings, in which.

DESCRIPTION OF PREFERRED EMBODIMENTS

The invention is now described by way of reference to examples and embodiments.

Examples are presented of a two-stage MIMO arrangement, having two antennas. In general the described techniques are applicable to an n-stage MIMO arrangement, having n antennas.

An exemplary, but non-limiting, implementation of the apparatus described is in the front-end of an RF device, such as a mobile RF device, such as a mobile phone.

Figure 2:
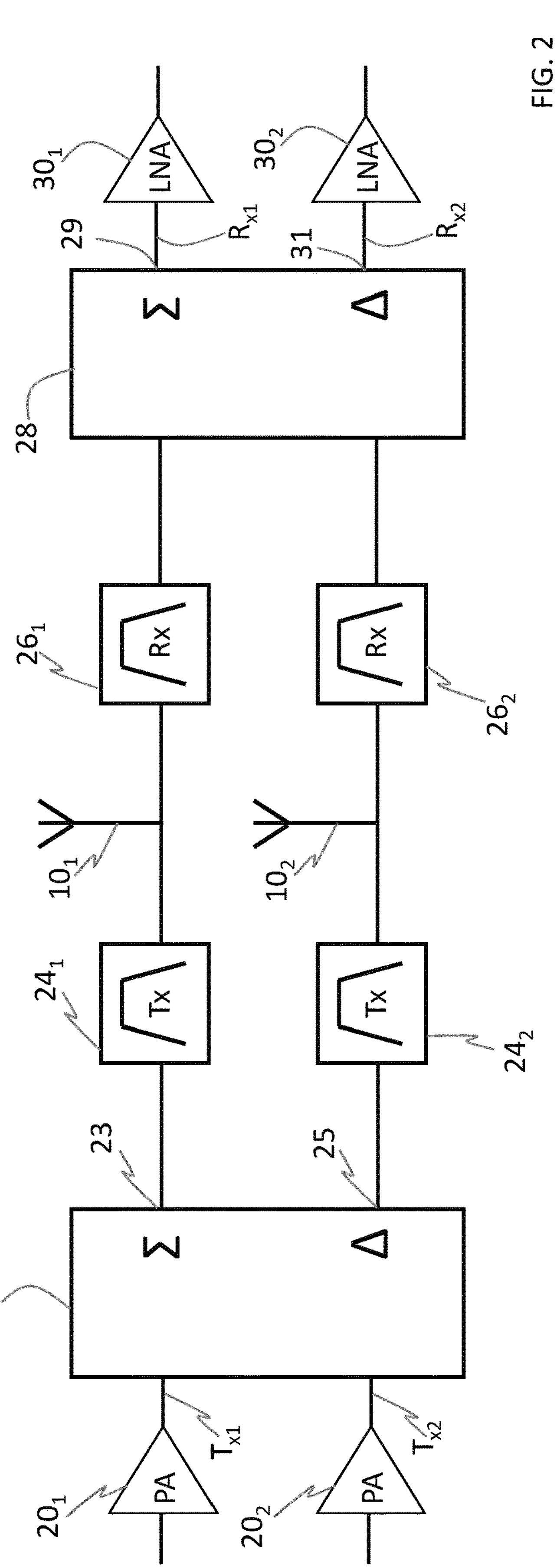
FIG. 2 illustrates an exemplary implementation of a two-antenna MIMO arrangement.

With reference to FIG. 2 there is illustrated a MIMO arrangement including first and second antennas $\mathbf{10}_1$ and $\mathbf{10}_2$. The first and second antennas $\mathbf{10}_1$, $\mathbf{10}_2$ respectively transmit signals on transmit paths to the respective antennas, and respectively receive signals on receive paths from the respective antennas.

The MIMO arrangement of FIG. 2 additionally includes on the transmit side a first power amplifier $\mathbf{20}_1$ in the first transmit path and a second power amplifier $\mathbf{20}_2$ in the second transmit path, each connected to receive a respective signal to be transmitted and for generating a respective transmit signal $T_{x1}$ and $T_{x2}$ to inputs of a 180° transmit hybrid circuit 22. Thus each transmit signal on a transmit path is provided as an input to a single 180° hybrid circuit.

The 180° transmit hybrid circuit has a sum output 23 and a difference output 25. The sum output 23 is connected to an input of a first transmit filter $\mathbf{24}_1$, which in turn has an output connected to the first antenna $\mathbf{10}_1$. The difference output 25 is connected to an input of a second transmit filter $\mathbf{24}_2$, which in turn has an output connected to the second antenna $\mathbf{10}_2$.

The signal at the sum output 23 of the hybrid circuit 22 is the sum of the two signals received from the two transmit paths. The signal at the difference output 25 of the hybrid circuit 22 is the difference of the two signals received from the two transmit paths.

The MIMO arrangement of FIG. 2 additionally includes on the receive side a first receive filter $\mathbf{26}_1$ and a second receive filter $\mathbf{26}_2$, each connected to receive signals from the first and second antennas $\mathbf{10}_1$ and $\mathbf{10}_2$ respectively. Each receive filter $\mathbf{26}_1$ and $\mathbf{26}_2$ is connected to provide the signal received from the respective antennas $\mathbf{10}_1$ and $\mathbf{10}_2$ to a 180° receive hybrid circuit 28. Thus each received signal at the antennas is provided as an input to a single 180° receive hybrid circuit.

The 180° receive hybrid circuit 28 has a sum output 29 and a difference output 31. The sum output 29 provides the signal $R_{x1}$ to an input of a first low noise amplifier 301. The difference output 31 provides the signal $R_{x2}$ to an input of a second low noise amplifier $\mathbf{30}_2$.

The signal at the sum output 29 of the hybrid circuit 28 is the sum of the two signals received from the two antennas. The single at the difference output 31 of the hybrid circuit 28 is the difference of the two signals received from the two antennas.

The low noise amplifiers each provide a signal on a respective receive path.

Typically both the transmit filters are tuned to the same (transmit) frequency, and the two transmit signals ($T_{x1}$ and $T_{x2}$) are both at the same frequency. Both the receive filters are typically tuned to the same (receive) frequency and both the receive signals ($R_{x1}$ and $R_{x2}$) are received at the same frequency. The antennas $\mathbf{10}_1$ and $\mathbf{10}_2$ have an operating bandwidth to cover both the transmit and receive bands.

The power amplifiers and the low noise amplifiers are not essential to the implementation of the MIMO arrangement to cancel interference, but are included in typical current MIMO implementations.

Implementation of the hybrid circuits 22 and 28 may be any known circuits for producing sum and difference signals, such as a hybrid transformer or a rat-race coupler. Any phase shift applied by the hybrid circuits 22 and 28 will be implementation dependent. For example:

In one implementation the sum may be $T_{x1}$ (90°)+$T_{x2}$ (90°) and the difference may be $T_{x1}$(90°)+$T_{x2}$(270°).

In one implementation the sum may be $T_{x1}$ (0°)+$T_{x2}$ (0°) and the difference may be $T_x$ (0°)+$T_2$ (180°).

In practice arbitrary phase may be added, e.g. due to the lengths of transmission lines. This will not affect the scheme provide it is equal between the two parts, such that the sum and difference relationships are preserved.

Figure 1:
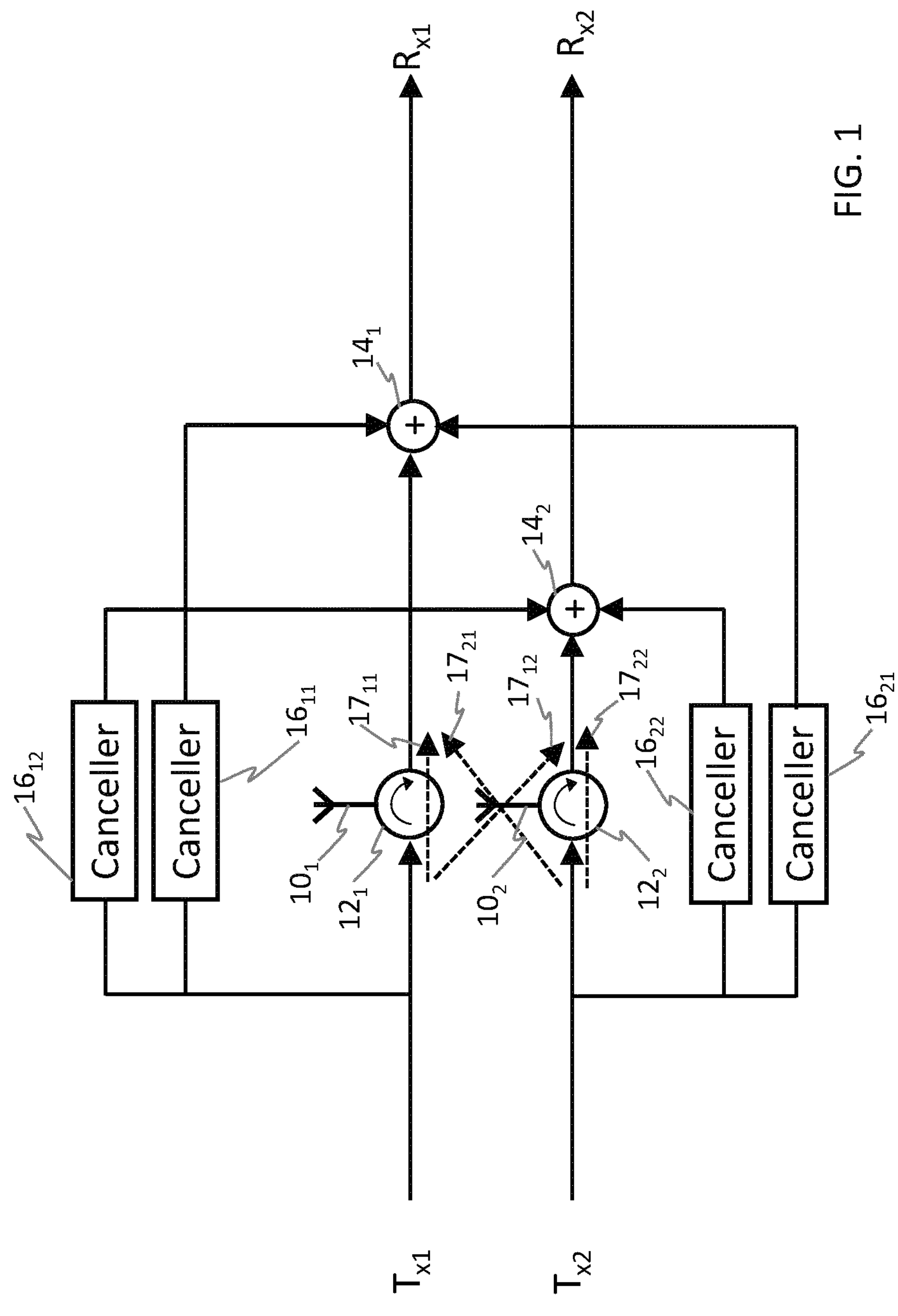
FIG. 1 illustrates an exemplary prior art implementation of a two-antenna MIMO arrangement including circuits for cancellation of interference between the transmit side and receive side.

With the MIMO arrangement of FIG. 2, cancellation of the interference described above is achieved without the need for the canceller circuit requirement of the prior art implementation of FIG. 1.

An explanation of the interference arising in the example arrangement of FIG. 2 is set out in the following discussion with reference to FIG. 3. Where elements in FIG. 3 correspond to elements in FIG. 2, like reference numerals are used.

Figure 3:
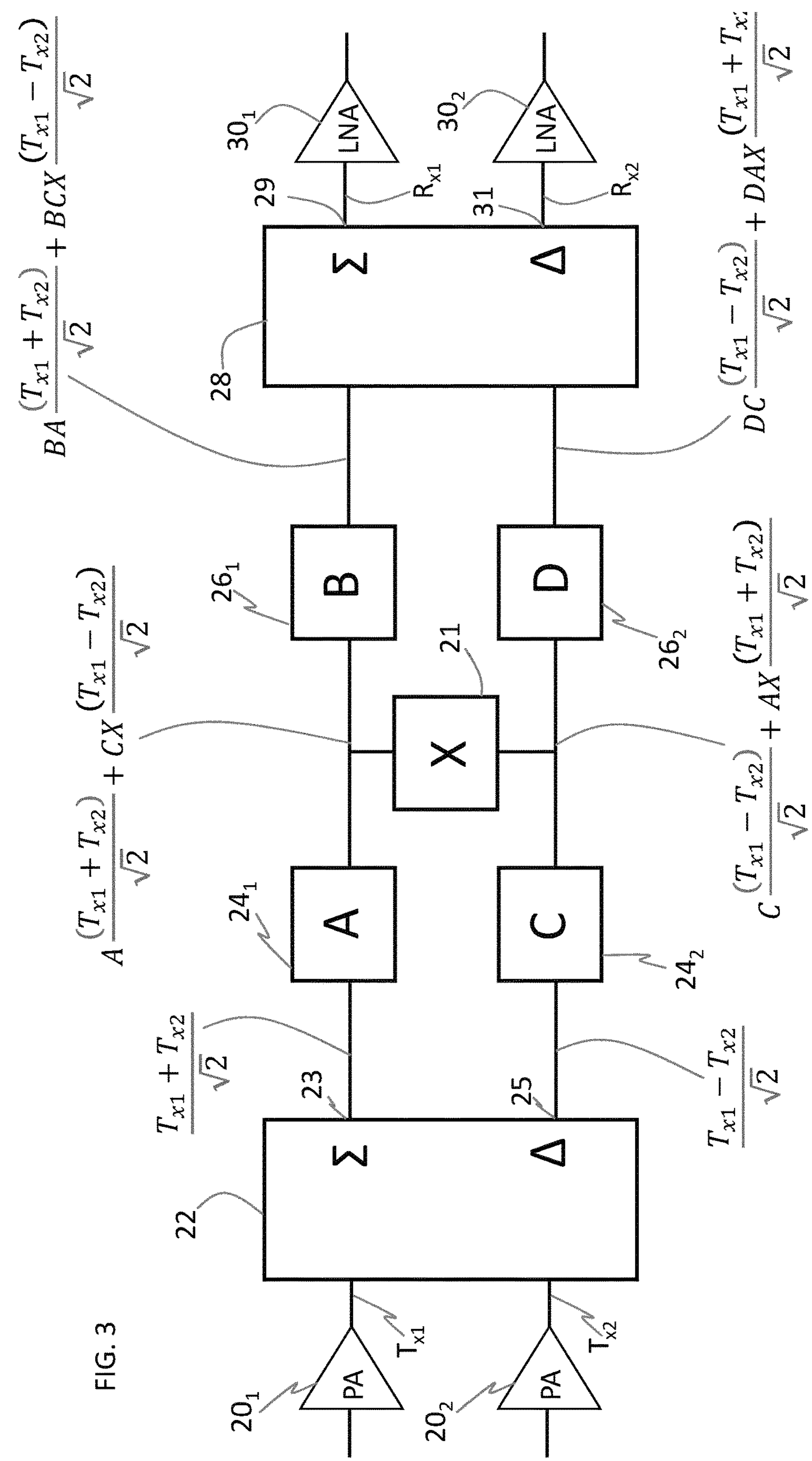
FIG. 3 illustrates schematically the implementation of FIG. 2, for explanation of the interference present which is then addressed by the exemplary implementation of FIG. 3.

With reference to FIG. 3 the first and second transmit filters $\mathbf{24}_1$ and $\mathbf{24}_2$ are denoted as A and C respectively, and the first and second receiver filters $\mathbf{26}_1$ and $\mathbf{26}_2$ are denoted by B and D respectively. The notations A, B, C and D denote the filter transfer function of the respective filters.

A block 21, denoted with the notation X, represents the cross-coupling channel between the two sets of transmit/receiver filters. This models the effect of the cross-coupling between the two antennas $\mathbf{10}_1$ and $\mathbf{10}_2$. The two antennas $\mathbf{10}_1$ and $\mathbf{10}_2$ are not shown in FIG. 4 for ease of illustration, and any signals received by the antennas are not considered in the following example (which is intended to illustrate the cancellation of transmit signal components arriving at the receiver). Hence the block 21 is shown as connected between the junction of the first transmit $\mathbf{24}_1$ and receive $\mathbf{26}_1$ filters, and the junction of the second transmit $\mathbf{24}_2$ and receive $\mathbf{26}_2$ filters.

The signal in the path at the sum output 23 of the transmit hybrid circuit 22 is:

$$\frac{T_{x1} + T_{x2}}{\sqrt{2}}$$

The signal in the path at the difference output 25 of the transmit hybrid circuit 22 is:

$$\frac{T_{x1} - T_{x2}}{\sqrt{2}}$$

In the following analysis the attenuation through filters $\mathbf{24}_1$, $\mathbf{24}_2$, $\mathbf{26}_1$, $\mathbf{26}_2$ is used to illustrate interference path measurements. However in general an analysis may take into account any circuitry as necessary according to the implementation. Whilst an evaluation based on attenuation limits the filters to being passive circuits, no general limitation applies, and this is only implementation specific to provide an example. The filters may be passive and/or active circuits.

As a result of the attenuation A through the first transmit filter 24$_1$, and the attenuations C through filter 24$_2$ and X through cross-antenna connection, the signal in the path at the output of the first transmit filter 24$_1$ is:

$$A\frac{(T_{x1}+T_{x2})}{\sqrt{2}}+CX\frac{(T_{x1}-T_{x2})}{\sqrt{2}}$$

As a result of the attenuation C through the second transmit filter 24$_2$, and the attenuations A through filter 24$_1$ and X through cross-antenna connection, the signal in the path at the output of the second transmit filter 24$_2$ is:

$$C\frac{(T_{x1}-T_{x2})}{\sqrt{2}}+AX\frac{(T_{x1}+T_{x2})}{\sqrt{2}}$$

As a result of the attenuation B through the first receive filter 26$_1$ the signal in the path at the output of the first receive filter 26$_1$ is:

$$BA\frac{(T_{x1}+T_{x2})}{\sqrt{2}}+BCX\frac{(T_{x1}-T_{x2})}{\sqrt{2}}$$

As a result of the attenuation D through the second receive filter 26$_2$ the signal in the path at the output of the second receive filter 26$_2$ is:

$$DC\frac{(T_{x1}-T_{x2})}{\sqrt{2}}+DAX\frac{(T_{x1}+T_{x2})}{\sqrt{2}}$$

Considering the signals entering and leaving the receive hybrid circuit 28, the expressions for the first received signal $R_{x1}$ and the second received signals $R_{x2}$ can be derived as follows.

For the first received signal, Rx1:

$$Rx1=\frac{BA\frac{(T_{x1}+T_{x2})}{\sqrt{2}}+BCX\frac{(T_{x1}-T_{x2})}{\sqrt{2}}}{\sqrt{2}}+\frac{DC\frac{(T_{x1}-T_{x2})}{\sqrt{2}}+DAX\frac{(T_{x1}+T_{x2})}{\sqrt{2}}}{\sqrt{2}}$$

$$Rx1=\frac{T_{x1}(BA+BCX+DAX+DC))}{2}+\frac{T_{x2}(BA-DC+DAX-BCX))}{2}$$

Using filter tuning, A is set equal to C, and B is set equal to D, therefore AB=AD=CB=CD. Thus the subtractions of BA and DC cancel each other out, and the subtractions of DAX and BCX cancel each other, eliminating the terms of $T_{x2}$. Therefore:

$$R_{x1}=\frac{T_{x1}(BA+BCX+DAX+DC))}{2}$$

And since AB=CD=CB=AD this further simplifies to $$R_{x1}=\frac{T_{x1}(BA+BAX+BAX+BA)}{2}$$

$$R_{x1}=T_{x1}(BA+BAX)$$

And therefore the transfer function from the $T_{x1}$ input to the $R_{x1}$ output is $$\frac{R_{x1}}{T_{x1}}=BA(1+X) \quad \text{Eqn. 1}$$

It can be seen that in the example arrangement of FIG. 2 the interference in the first receiver path $R_{x1}$ depends only on signals from the transmitter path $T_{x1}$, and not $T_{x2}$. This dependence of interference in the first receiver path on only signals in the first transmit path is as a result of the hybrid circuits. The use of the hybrid circuits cancels the interference from the second transmit path $T_{x2}$.

A canceller can therefore be implemented only between the first transmit path $T_{x1}$ and the first receiver path $R_{x1}$, to compensate solely for interference from the first transmit path. This canceller is set to cancel the interference in the first receiver path which results from the transmit signal $T_{x1}$, and thus reduce or eliminate the interference in the first receive path. This may be achieved when the transfer function of the canceller is the anti-phase value of Eqn. 1.

For the second received signal, $R_{x2}$:

$$R_{x2}=\frac{BA\frac{(T_{x1}+T_{x2})}{\sqrt{2}}+BCX\frac{(T_{x1}-T_{x2})}{\sqrt{2}}}{\sqrt{2}}-\frac{DC\frac{(T_{x1}-T_{x2})}{\sqrt{2}}+DAX\frac{(T_{x1}+T_{x2})}{\sqrt{2}}}{\sqrt{2}}$$

$$R_{x2}=\frac{T_{x1}(BA+BCX-DAX-DC))}{2}+\frac{T_{x2}(BA+DC-DAX-BCX))}{2}$$

Using filter tuning, A is set equal to C, and B is set equal to D, therefore AB=AD=CB=CD. Thus the subtractions of BA and DC cancel each other out, and the subtractions of DAX and BCX cancel each other, eliminating the terms of $T_{x1}$. Therefore:

$$R_{x2}=\frac{T_{x2}(BA+DC-DAX-BCX))}{2}$$

And since AB=CD=CB=AD this further simplifies to $$R_{x2}=\frac{T_{x2}(BA+BA-BAX-BAX)}{2}$$

$$R_{x2}=T_{x2}(BA-BAX)$$

And therefore the transfer function from the $T_{x2}$ input to the $R_{x2}$ output is $$\frac{Rx2}{T_{x2}}=BA(1-X) \quad \text{Eqn. 2}$$

It can be seen that in the example arrangement of FIG. 2 the interference in the second receiver path $R_{x2}$ depends only on signals from the second transmitter path $T_{x2}$, and not the first transmitter path $T_{x1}$. The use of the hybrid transmit circuit cancels the interference from the first transmit path $T_{x1}$.

A second canceller can therefore be implemented only between the second transmit path $T_{x2}$ and the second receive path $R_{x2}$, to compensate solely for interference from the second transmit path. This second canceller is set to cancel the interference in the second receiver path which results from the transmit signal $T_2$, and thus reduce or eliminate the interference in the second receive path. This may be achieved when the transfer function of the second canceller is the anti-phase value of Eqn. 2.

Although the action of the transmit hybrid circuit 22 results in both of the signals transmitted at the antennas 10$_1$ and 10$_2$ being dependent on both of the transmit signals $T_{x1}$ and $T_{x2}$, it remains possible to independently control the signals transmitted from the antennas 10$_1$ and 10$_2$ by appropriately controlling the signals $T_{x1}$ and $T_{x2}$. For example if the signals Y and Z are to be transmitted at the antennas 10$_1$ and 10$_2$ respectively, the this can be achieved by setting $$T_{x1} = Y + Z/\sqrt{2}$$

and $$T_{x2} = Y - Z/\sqrt{2}$$

In this case the signal in the path at the sum output 23 of the transmit hybrid circuit 22 is:

$$\frac{T_{x1} + T_{x2}}{\sqrt{2}} = \frac{\frac{(Y+Z)}{\sqrt{2}} + \frac{(Y-Z)}{\sqrt{2}}}{\sqrt{2}} = \frac{2Y}{2} = Y$$

Similarly, setting $$T_{x1} = Y + Z/\sqrt{2}$$

and $$T_{x2} = Y - Z/\sqrt{2}$$

means that the signal in the path at the difference output 25 of the transmit hybrid circuit 22 is:

$$\frac{T_{x1} - T_{x2}}{\sqrt{2}} = \frac{\frac{(Y+Z)}{\sqrt{2}} - \frac{(Y-Z)}{\sqrt{2}}}{\sqrt{2}} = \frac{2Z}{2} = Z$$

Thus, despite the addition and subtraction operations implemented in the transmit hybrid circuit 22, the signals transmitted from the antennas can still be independently controlled, as may be required for a particular MIMO transmission. In some embodiments this could enable either one of the antennas 10$_1$ and 10$_2$ to be used for transmission with the other antenna not transmitting. Some embodiments may therefore also provide a MIMO arrangement which has the ability to operate in both single antenna and MIMO operating modes. In a similar manner to the above example, the signals received at each antenna 10$_1$ and 10$_2$ can be recovered by processing the sum and difference of the receive signals $R_{x1}$ and $R_{x2}$, if required.

Figure 4:
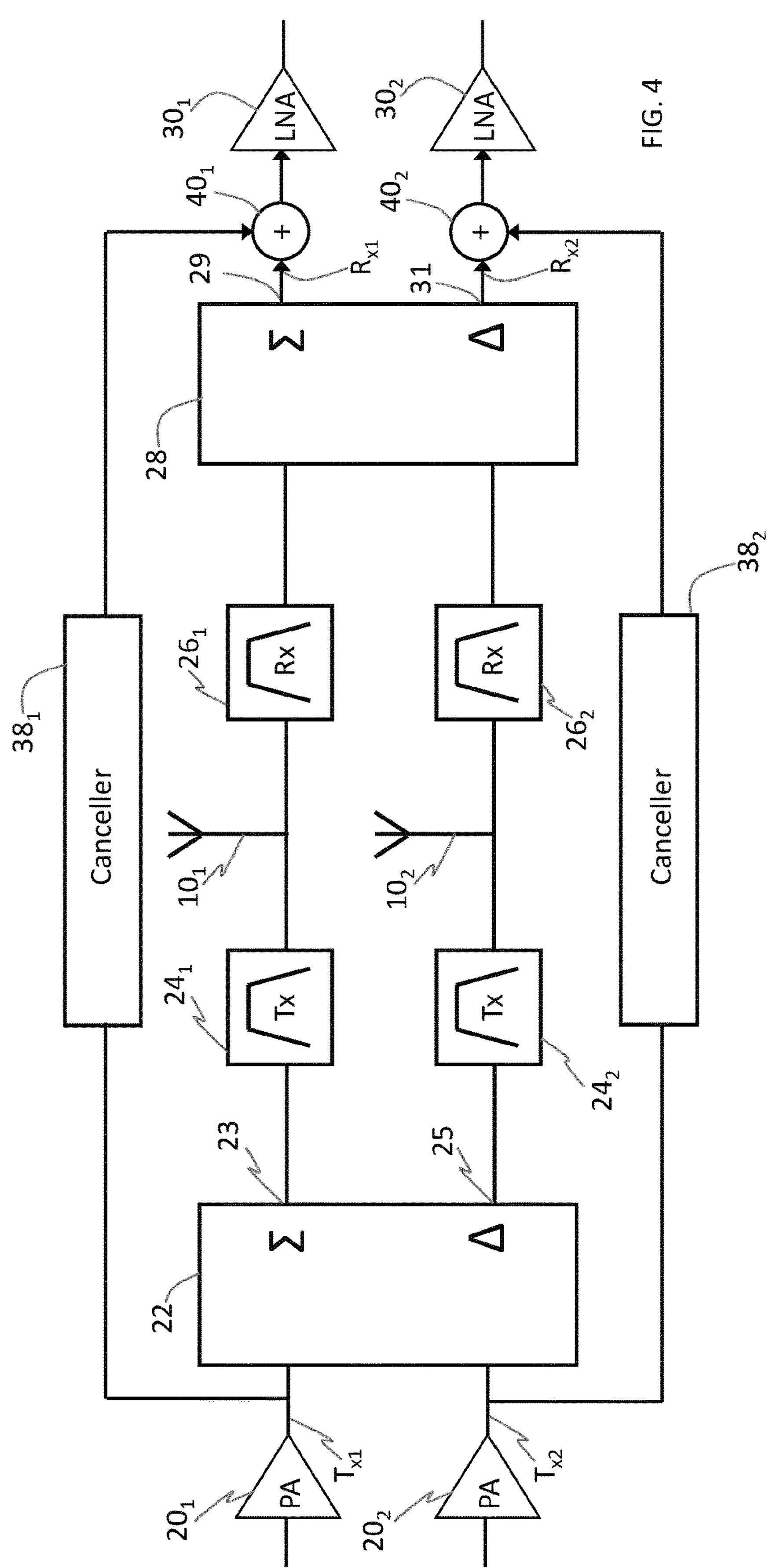
FIG. 4 illustrates an exemplary implementation of an improved two-antenna MIMO arrangement including circuits for cancellation of interference between the transmit side and receive side.

FIG. 4 illustrates the implementation of a MIMO arrangement in accordance with FIG. 2, with the inclusion of canceller circuits to cancel interference between antenna transmit paths and antenna receive paths. Where elements in FIG. 4 correspond to elements in FIG. 2, like reference numerals are used.

The MIMO arrangement of FIG. 4 introduces canceller circuits to cancel the interference in accordance with the determination of interference as explained with reference to FIG. 3.

Comparing FIG. 4 to FIG. 2, first and second canceller circuits 38$_1$ and 38$_2$ are added, and first and second combiners 40$_1$ and 40$_2$ are added.

The first canceller circuit 38$_1$ has an input connected to the transmit signal $T_{x1}$ output of the power amplifier 20$_1$. The first combiner 40$_1$ is connected to receive the sum output 29 of the 180° receive hybrid circuit 28, and combines the sum output 29 with the output of the canceller circuit 38$_1$, to provide the receive signal $R_{x1}$ at the input to the low noise amplifier 301.

The second 38$_2$ canceller circuit has an input connected to the transmit signal $T_{x2}$ at the output of the power amplifier 20$_2$. The second combiner 40$_2$ is added to connect the difference output 31 of the 180° receive hybrid circuit 28, and combines the difference output 31 with the output of the canceller circuit 38$_2$, to provide the receive signal $R_{x2}$ at the input to the low noise amplifier 30$_2$.

Comparing the FIG. 4 arrangement with the FIG. 1 arrangement, it can be seen that one canceller circuit is required for each antenna in the MIMO arrangement, such that the number of canceller circuits required maps to the number of antennas, unlike in the arrangement of FIG. 1 where the number of canceller circuits required is the square of the number of antennas.

In general each canceller circuit 38$_1$ and 38$_2$ injects the inverse of the interference in the respective path and the output of the hybrid circuit 28. The canceller 38$_1$ implements the inverse of egn. 1, and the canceller 38$_2$ implements the inverse of eqn. 2.

In some embodiments, the canceller circuits 38$_1$ and 38$_2$ may be passive circuit networks with tuneable and/or fixed circuit components (e.g resistors, capacitors, inductors, transformers, transmissions lines, and/or other components), enabling the frequency response (i.e. transfer function) of said networks to be adjusted such that cancellation signals are produced which are anti-phase copies of the self-interference signals at the outputs 29 and 31 respectively of the receive hybrid 28, over a frequency band or bands of interest (e.g. a transmit and/or receive frequency band). The tuneable components within the respective cancellers 38$_1$ and 38$_2$ enable the transfer functions of the cancellers to be adjusted and/or tuned such that the interference from the respective transmit paths in the respective receive paths are cancelled in the respective combiners 40$_1$ and 40$_2$.

Whilst additional circuitry is also required—specifically the 180° hybrid circuits 22 and 28—the overall circuitry required is less than is required in an arrangement such as FIG. 1.

Figure 5:
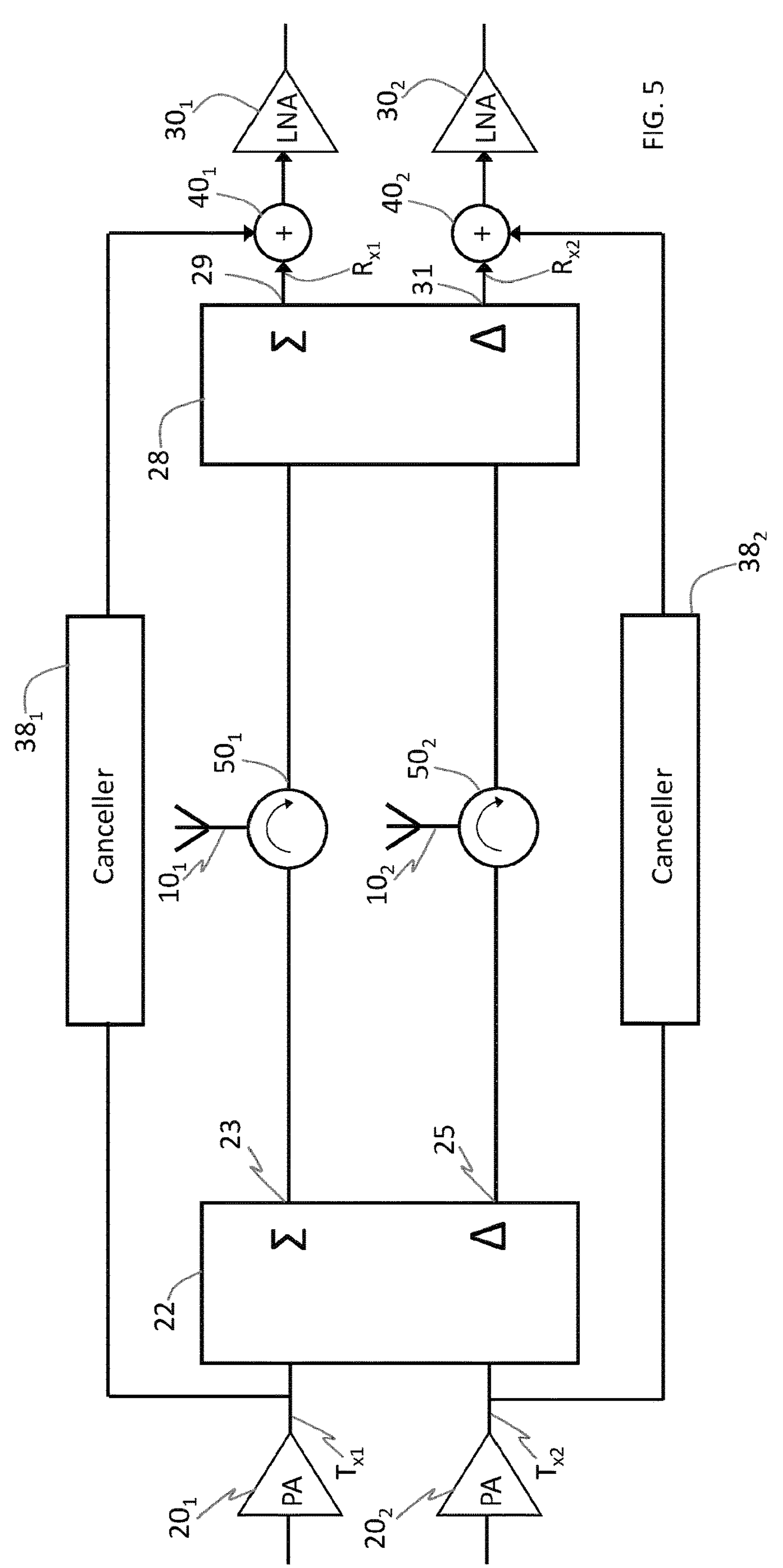
FIG. 5 illustrates an alternative exemplary implementation of an improved two-antenna MIMO arrangement including circuits for cancellation of interference between the transmit side and receive side.

FIG. 5 illustrates an alternative implementation of a MIMO arrangement in accordance with the interference cancellation techniques of FIG. 4. Where elements in FIG. 5 correspond to elements in FIG. 4, like reference numerals are used.

As shown in FIG. 5, the first and second transmit filters $\mathbf{24}_1$, $\mathbf{24}_2$ and the first and second receive filters $\mathbf{26}_1$, $\mathbf{26}_2$ are replaced by first and second circulators $\mathbf{50}_1$ and $\mathbf{50}_2$.

The first circulator $\mathbf{50}_1$ is connected to the antenna $\mathbf{10}_1$, and receives the sum output of the 180° transmit hybrid circuit 22, and provides an input to the 180° receive hybrid circuit 28.

The second circulator $\mathbf{50}_2$ is connected to the antenna $\mathbf{10}_2$, and receives the difference output of the 180° transmit hybrid circuit 22, and provides an input to the 180° receive hybrid circuit 28.

The canceller circuits $\mathbf{38}_1$ and $\mathbf{38}_2$ of FIG. 5 may perform the same function via the same means as was described with reference to FIG. 4.

As observed in relation to FIG. 2, the transmit filters are tuned to the same transmit frequency and the receive filters are tuned to the same receive frequency. In the arrangement of FIG. 5 where circulators replace the transmit and receive filters, each circular can be used for transmitting and receiving on the same frequency at the same time.

Figure 6:
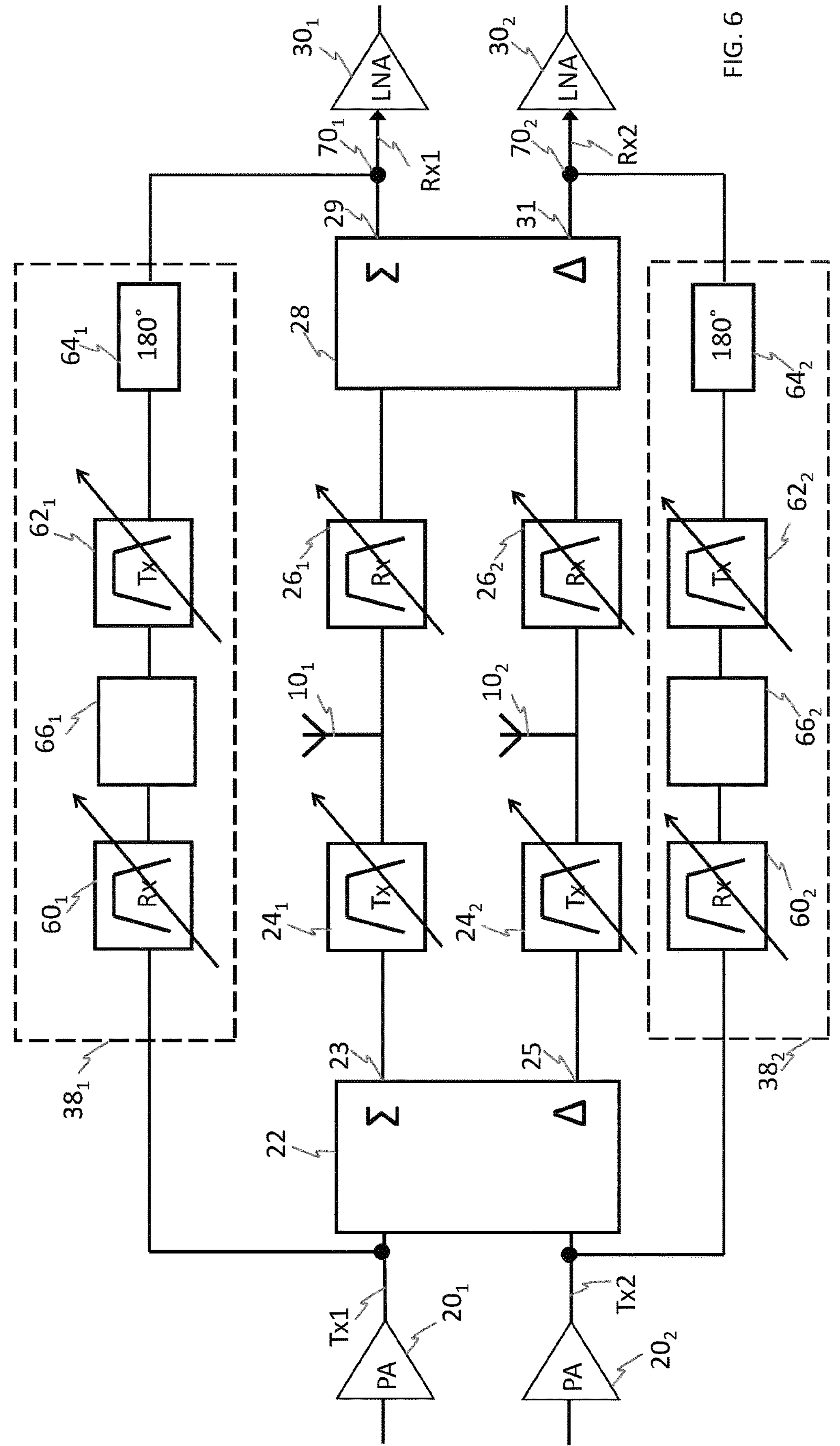
FIG. 6 illustrates an alternative exemplary implementation of an improved two-antenna MIMO arrangement including an example implementation of circuits for cancellation of interference between the transmit side and receive side.

With reference to FIG. 6 there is illustrated an example implementation of the cancellers of FIG. 4. Where elements in FIG. 6 correspond to elements in FIG. 4, like reference numerals are used.

The canceller implementations shown in FIG. 6 are based on implementing the requirements of Eqn. 1 and Eqn. 2 as stated above.

In the example implementation of FIG. 6, the first and second combiners $\mathbf{40}_1$ and $\mathbf{40}_2$ are implemented simply as connection points $\mathbf{70}_1$ and $\mathbf{70}_2$ of the three signals to/from the respective combiners $\mathbf{40}_1$ and $\mathbf{40}_2$.

The first and second transmit filters $\mathbf{24}_1$ and $\mathbf{24}_2$ and the first and second receive filters $\mathbf{26}_1$ and $\mathbf{26}_2$ are preferably implemented as tuneable filters. They may be implemented as tuneable filters in any implementation.

The canceller $\mathbf{38}_1$ comprises a first canceller receive filter $\mathbf{60}_1$ having an input connected to the output of the first power amplifier $\mathbf{20}_1$, a first canceller transmit filter $\mathbf{62}_1$ having an input connected to the output of the first canceller receive filter $\mathbf{60}_1$, a 180° phase shifter $\mathbf{64}_1$ connected between the output of the first canceller receive filter $\mathbf{62}_1$ and the combiner connection point $\mathbf{70}_1$, and a sub-canceller circuit $\mathbf{66}_1$ connected between the first canceller transmit and first canceller receive filters $\mathbf{60}_1$ and $\mathbf{62}_1$.

The canceller $\mathbf{38}_2$ comprises a second canceller receive filter $\mathbf{60}_2$ having an input connected to the output of the second power amplifier $\mathbf{20}_2$, a second canceller transmit filter $\mathbf{62}_2$ having an input connected to the output of the second canceller receive filter $\mathbf{60}_2$, a 180° phase shifter $\mathbf{64}_2$ connected between the output of the second canceller receive filter $\mathbf{62}_1$ and the combiner connection point $\mathbf{70}_2$, and a sub-canceller circuit $\mathbf{66}_2$ connected between the second canceller transmit and second canceller receive filters $\mathbf{60}_2$ and $\mathbf{62}_2$.

In some embodiments, the sub-canceller circuits $\mathbf{66}_1$ and $\mathbf{66}_2$ may be passive networks with tuneable and/or fixed circuit components, enabling the frequency response of the network to be adjusted in order that, together with the tuneable filters contained within the cancellers $\mathbf{38}_1$ and $\mathbf{38}_2$, the frequency response of the cancellers $\mathbf{38}_1$ and $\mathbf{38}_2$ can be tuned such that a cancellation signals are produced at the canceller outputs which are antiphase copies of the self-interference signals at the outputs 29 and 31 respectively of the receive hybrid 28, over a frequency band or bands of interest (e.g. a transmit and/or receive frequency band). The cancellers $\mathbf{38}_1$ and $\mathbf{38}_2$ may preferably compensate for self-interference coupling components which result from the cross-coupling of signals between the antennas $\mathbf{10}_1$ and $\mathbf{10}_2$ (as denoted by the notation X in the equations above).

In some embodiments, the transmit filters $\mathbf{24}_1$, $\mathbf{24}_2$, $\mathbf{62}_1$ and $\mathbf{62}_2$ may be circuits of identical design, and may be tuned to have identical centre frequencies and transfer functions, and the receive filters $\mathbf{26}_1$, $\mathbf{26}_2$, $\mathbf{60}_1$ and $\mathbf{60}_2$ may be circuits of identical design, and may be tuned to have identical centre frequencies and transfer functions. In such an embodiment, the aggregate transfer function of the cancellation circuit $\mathbf{38}_1$ between the output of the power amplifier $\mathbf{20}_1$ and the connection point $\mathbf{70}_1$ may be equal in magnitude and opposite in phase compared to the aggregate transfer function of the circuit comprising the hybrid circuit 22, filter $\mathbf{24}_1$, antenna $\mathbf{10}_1$, filter $\mathbf{26}_1$, and hybrid 29, between the output of the power amplifier $\mathbf{20}_1$ and the connection point $\mathbf{70}_1$.

Where the filters $\mathbf{62}_1$ and $\mathbf{24}_1$ have identical transfer functions denoted by the notation A and filters $\mathbf{60}_1$ and $\mathbf{26}_1$ have identical transfer functions denoted by the notation B (using the same notation as used above in FIG. 3), and noting the signal inversion due to the 180° phase shift, the aggregate transfer function of the canceller $\mathbf{38}_1$ can be written as −BLA, where the notation L denotes the transfer function of the sub-canceller circuit $\mathbf{66}_1$. If the sub-canceller circuit $\mathbf{66}_1$ is tuned to provide that L=(1+X), then the transfer function of the canceller $\mathbf{38}_1$ is −BA(1+X), which is the inverse of Eqn. 1, thereby effecting cancellation at the connection point $\mathbf{70}_1$.

Likewise, where the filters $\mathbf{62}_2$ and $\mathbf{24}_2$ have identical transfer functions denoted by the notation A and filters $\mathbf{60}_2$ and $\mathbf{26}_2$ have identical transfer functions denoted by the notation B, and noting the signal inversion due to the 180° phase shift, the aggregate transfer function of the canceller $\mathbf{38}_2$ can be written as −BPA, where the notation P denotes the transfer function of the sub-canceller circuit $\mathbf{66}_2$. If the sub-canceller circuit $\mathbf{66}_2$ is tuned to provide that P=(1−X), then the transfer function of the canceller $\mathbf{38}_2$ is −BA(1−X), which is the inverse of Eqn. 2, thereby effecting cancellation at the connection point $\mathbf{70}_2$.

In other embodiments, the filters $\mathbf{62}_2$ and $\mathbf{24}_2$ may have differing designs and/or transfer functions, and the filters $\mathbf{60}_2$ and $\mathbf{26}_2$ may have differing designs and/or transfer functions. Furthermore, in some embodiments, there may be additional loss and/or phase shift applied by the hybrid junctions 22 and 28 due to manufacturing imperfections. However, in such embodiments cancellation of self-interference can still be achieved by tuning the filters and/or sub-cancellers comprising the cancellers $\mathbf{38}_1$ and $\mathbf{38}_2$ such that the transfer functions of the cancellers $\mathbf{38}_1$ and $\mathbf{38}_2$ are the inverse of the self-interference coupling channels between $T_{x1}$ and $R_{x1}$, and between $T_{x2}$ and $R_{x2}$, respectively.

The order of the transmit and receiver filters is preferably swapped in the canceller path. As this is a linear system the aggregate transfer function is the same. The filters are preferably swapped so that the canceller does not load the transmit and receive ports. For example, considering the output of the power amplifiers $\mathbf{20}_1$ and $\mathbf{20}_2$, at this point in the circuit it is desirable (for reason of transmitter energy efficiency) for most of the power at the transmit frequency to be transferred into the hybrid circuit (and be transmitted from the antennas), and for minimal transmit power to be transferred into the cancellation circuit. This occurs in the example design because the receiver filter only passes minimal energy at the transmit frequency (which is in the stopband of the receiver filter). Likewise, the output of the receive hybrid 28 is connected to the low noise amplifier and also the canceller—here it is desired for all the energy at the receive frequency to be transferred to the low noise amplifier, not into the canceller output. This is achieved with having a transmit filter here, which will pass minimal energy at the receive frequency.

The present example assumes the transfer functions of the filters $\mathbf{62}_1$, $\mathbf{62}_2$, $\mathbf{24}_1$, and $\mathbf{24}_2$ have identical transfer functions, and filters $\mathbf{60}_1$, $\mathbf{60}_2$, $\mathbf{26}_1$, and $\mathbf{26}_2$ have identical transfer functions, and the sub-canceller networks $\mathbf{66}_1$ and $\mathbf{66}_2$ are tuned to compensate for the antenna cross-coupling, In other embodiments the filters $\mathbf{60}_1$, $\mathbf{60}_2$, may exhibit differing transfer functions to the filters $\mathbf{26}_1$, and $\mathbf{26}_2$; the filters $\mathbf{62}_1$, $\mathbf{62}_2$, may exhibit differing transfer functions to the filters $\mathbf{24}_1$, and $\mathbf{24}_2$; and the sub-canceller circuits $\mathbf{62}_1$, $\mathbf{62}_2$ may be also tuned to provide a different transfer function as may be required to provide cancellation of the self-interference signals at the respective signal junctions $\mathbf{70}_1$ and $\mathbf{70}_2$. In general a preferable requirement is that the cancellation path has the inverse transfer function compared to the self-interference path, including any compensation for the antenna cross-coupling as may be required. Such compensation could occur in any of the tuneable circuits which comprise the respective cancellers $\mathbf{38}_1$ and $\mathbf{38}_2$.

It should be noted that this is an example implementation. In an arrangement such as shown in FIG. 5, the transmit and receive filters are not present. In general, a canceller circuit is provided to combine with each signal received from the antenna in a receive path, to cancel the interference from the corresponding transmit path.

Figure 7:
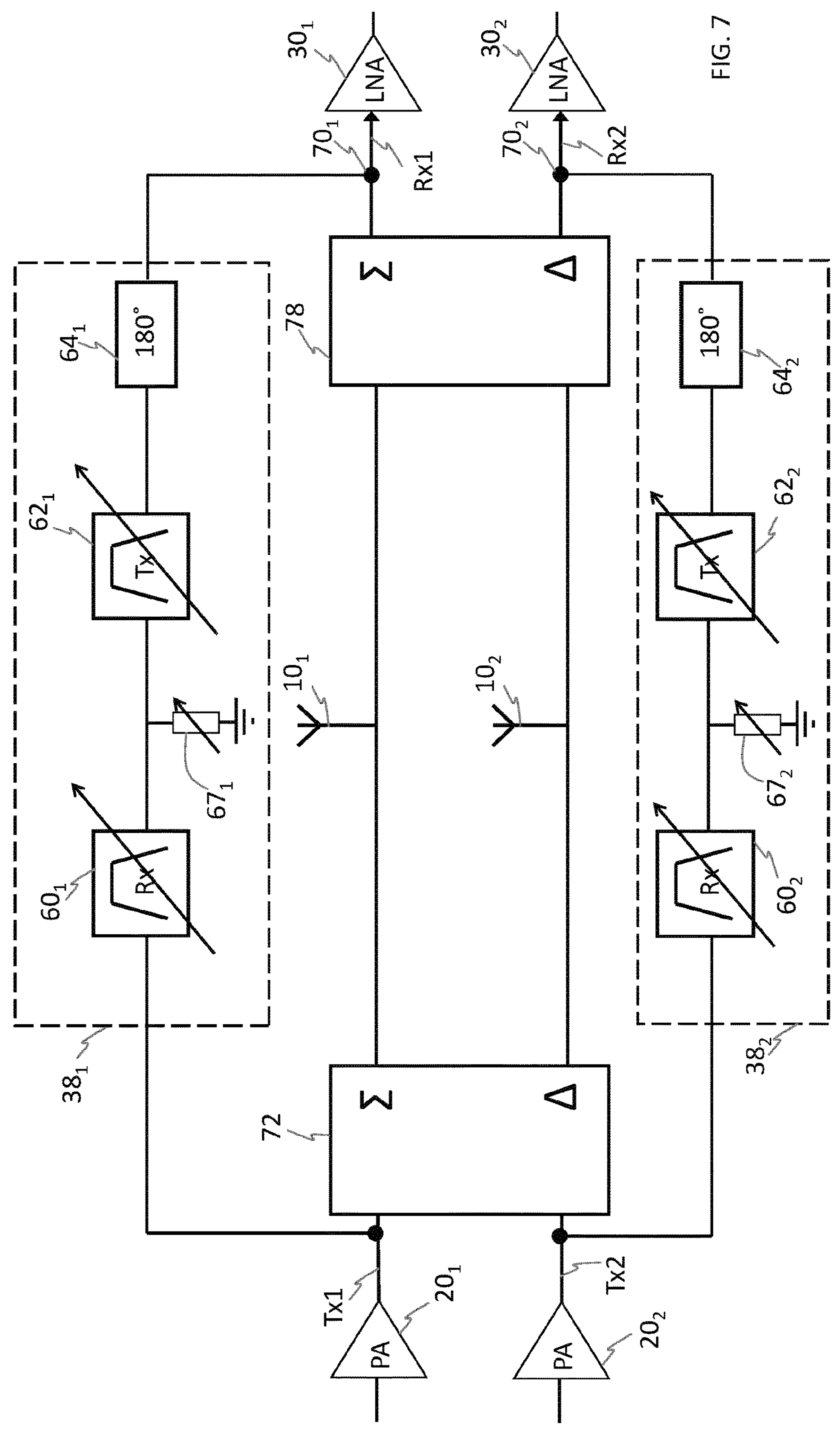
FIG. 7 illustrates an alternative exemplary implementation of an improved two-antenna MIMO arrangement including an example implementation of circuits for cancellation of interference between the transmit side and receive side.

In the example arrangement of FIG. 7 the cancelers $\mathbf{38}_1$ and $\mathbf{38}_2$ are each shown as including a 180° phase shift circuit $\mathbf{64}_1$ and $\mathbf{64}_2$. This phase shift circuit may be considered as part of the respective canceller circuit as shown, or may be provided as a circuit separate to the canceller circuit, but located in the cancellation path. Alternatively, this 180° phase shift may be provided in the receive path, for example at the sum or difference output of the hybrid circuit 28. Alternatively, this 180° phase shift could be provided elsewhere in the system; those skilled in the art will recognise that the requirement is only that the respective cancellation signals are combined in antiphase to the respective interference signals in the respective receive paths, and there exists a multitude of positions in the circuit where phase shifting may be provided to achieve this.

With reference to FIG. 7 there is illustrated an example implementation of the MIMO of FIG. 6. Where elements in FIG. 7 correspond to elements in FIG. 6, like reference numerals are used.

In the example implementation of FIG. 7, the 180° transmit hybrid circuit 22 is replaced with a 180° transmit hybrid circuit 72, and the 180° receive hybrid circuit 28 is replaced with a 180° receive hybrid circuit 78.

In the example implementation of FIG. 7, the first and second transmit filters $\mathbf{24}_1$ and $\mathbf{24}_2$ of FIG. 6 are not provided as distinct filters, but the 180° transmit hybrid circuit 72 is an integrated filter and hybrid network, such that the functionality of the first and second transmit filters $\mathbf{24}_1$ and $\mathbf{24}_2$ of FIG. 6 are integrated into the 180° transmit hybrid circuit 72. The integrated transmit filters are preferably tuneable.

In the example implementation of FIG. 7, the first and second receive filters $\mathbf{24}_1$ and $\mathbf{24}_2$ of FIG. 6 are not provided as distinct filters, but the 180° receive hybrid circuit 72 is an integrated filter and hybrid network, such that the functionality of the first and second transmit filters $\mathbf{26}_1$ and $\mathbf{26}_2$ of FIG. 6 are integrated to the 180° receive hybrid circuit 78. The integrated receive filters are preferably tuneable.

The first antenna $\mathbf{10}_1$ is then connected to the sum output of the 180° hybrid circuit 72 and to an input of the 180° hybrid circuit 78. The second antenna $\mathbf{10}_2$ is then connected to the difference output of the 180° hybrid circuit 72 and to an input of the 180° hybrid circuit 78.

Also on FIG. 7 example implementation of the sub-canceller circuits $\mathbf{66}_1$ and $\mathbf{66}_2$ are shown. These example implementations are not limited to the implementation of the hybrid circuits 72 and 78. In the example, the sub-canceller circuits $\mathbf{66}_1$ and $\mathbf{66}_2$ are implemented as respective variable impedance circuits $\mathbf{67}_1$ and $\mathbf{67}_2$, having one node connected between the canceller receive and transmit filters, and one node connected between to ground. Such variable impedance circuits may comprise a network of one or more fixed and/or tuneable circuit elements. In some embodiments, where the filters $\mathbf{62}_1$, $\mathbf{62}_2$, $\mathbf{24}_1$, and $\mathbf{24}_2$ have identical transfer functions, and filters $\mathbf{60}_1$, $\mathbf{60}_2$, $\mathbf{26}_1$, and $\mathbf{26}_2$ have identical transfer functions, and there is no cross coupling between the antennas, then it may be preferable for the impedance circuits $\mathbf{67}_1$ and $\mathbf{67}_2$ to be adjusted to provide the same impedance as the antennas $\mathbf{10}_1$ and $\mathbf{10}_2$ respectively. Where there is cross-coupling of signals between antennas $\mathbf{10}_1$ and $\mathbf{10}_2$ then it may be preferable to make further adjustments to the impedances of the tuneable impedance circuits $\mathbf{67}_1$ and $\mathbf{67}_2$ in order to cancel cross-coupling between the antennas. In general the variable impedance circuits $\mathbf{67}_1$ and $\mathbf{67}_2$ may be adjusted to increase the level of cancellation provided at the respective signal junctions $\mathbf{70}_1$ and $\mathbf{70}_2$ in the frequency band or bands of interest (e.g. a transmit and/or receive frequency band).

Figure 8:
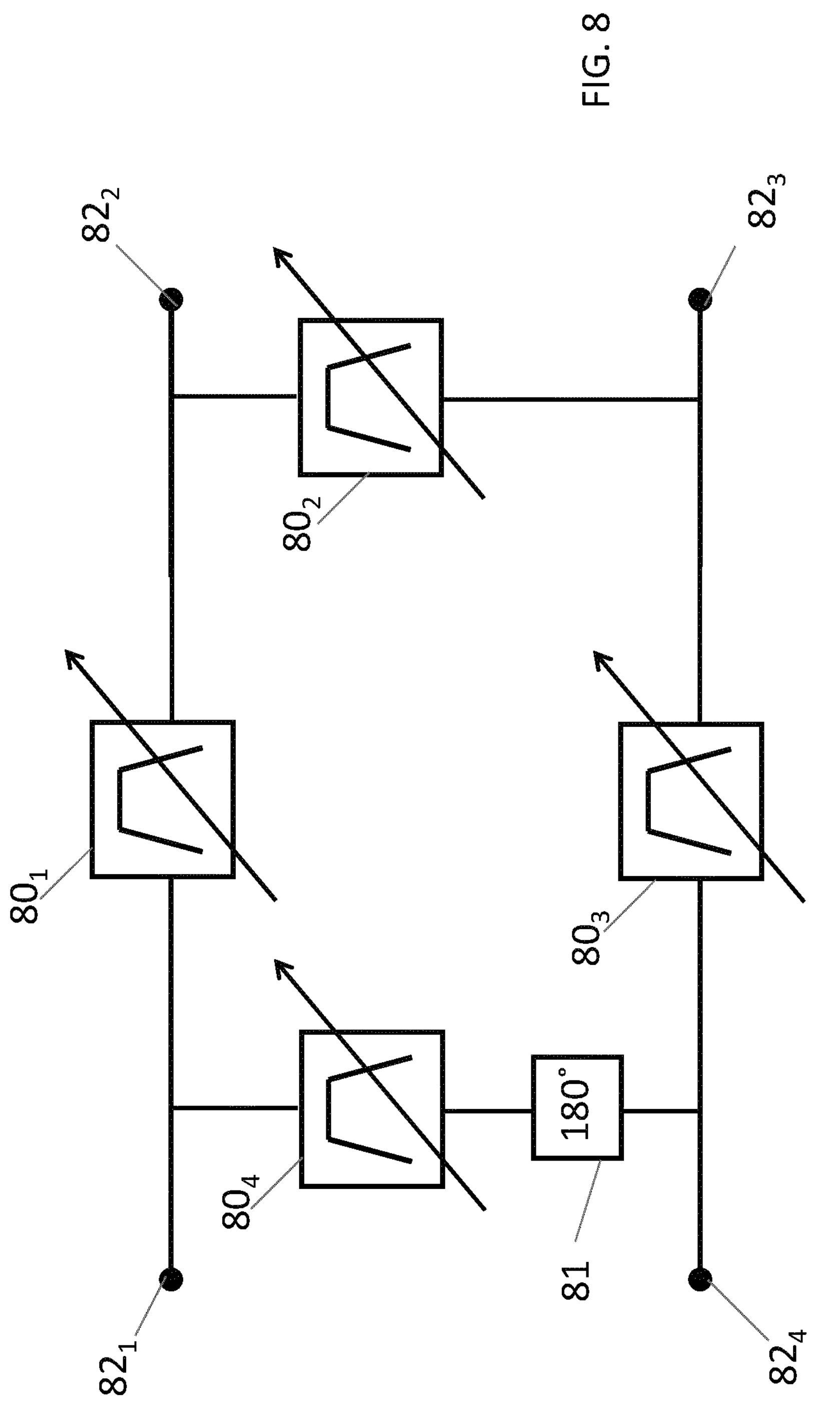
FIG. 8 illustrates an exemplary filter/hybrid network which may be used in the arrangement of FIG. 7.

With reference to FIG. 8 there is illustrated an example implementation of an integrated filter and hybrid network such as shown in FIG. 7.

In this example the integrated filter and hybrid network is a 4-port network, having two input ports $\mathbf{82}_1$ and $\mathbf{82}_4$, and two output ports $\mathbf{82}_2$ and $\mathbf{82}_3$. A filter $\mathbf{80}_2$ is connected between the port $\mathbf{82}_1$ and the port $\mathbf{82}_2$, a filter $\mathbf{80}_2$ is connected between the port $\mathbf{82}_2$ and the port $\mathbf{82}_3$ a filter $\mathbf{80}_3$ is connected between the port $\mathbf{82}_3$ and the port $\mathbf{82}_4$, and a filter $\mathbf{80}_4$ and 180° phase shifter are connected in series between the port $\mathbf{82}_1$ and the port $\mathbf{82}_4$. The filters $\mathbf{80}_1$, $\mathbf{80}_2$, $\mathbf{80}_3$, and/or $\mathbf{80}_4$ may be tuneable.

In this network, a signal entering port $\mathbf{82}_1$ is filtered and coupled to port $\mathbf{82}_2$ with 0° phase shift, and filtered and coupled to port $\mathbf{82}_4$ with 180° phase shift. A signal entering port $\mathbf{82}_3$ is filtered and coupled to ports $\mathbf{82}_4$ and $\mathbf{82}_2$ both with 0° phase shift. The signal exiting port $\mathbf{82}_4$ will therefore be the difference between the signals entering ports $\mathbf{82}_3$ and $\mathbf{82}_1$ with filtering applied, and the signal exiting port $\mathbf{82}_2$ will be the sum of the signals entering ports $\mathbf{82}_1$ and $\mathbf{82}_3$, with filtering applied.

Either of the integrated tuneable filter/hybrid networks 72 or 78 may be implemented in accordance with the arrangement of FIG. 8. Other implementations may be used. Various examples and embodiments have been set out as circuits or apparatus. The invention is not limited to circuits or apparatus. The invention may be embodied by methods or processes. Methods or processes may be implemented, at least in part, utilising computer processing techniques. A computer program code may be provided which, when executed on a processor, such as the processor illustrated in examples above, may perform any method or process, at least in part. A computer program product may be provided on which such computer program code is stored.

Various examples and embodiments have been set out to illustrate the invention. Aspects of examples and embodiments may be combined.

The invention has been described by way of reference to various embodiments and implementations. The invention is not limited to the specifics of any example. The scope of protection afforded by the invention is defined by the appended claims.

The invention claimed is:

1. A multiple input, multiple output, MIMO, antenna arrangement comprising:
- a transmit hybrid circuit connected to receive first and second transmit signals, and to output a sum of the first and second transmit signals, and to output a difference of the first and second transmit signals,
- a first antenna connected to receive the output sum;
- a second antenna connected to receive the output difference;
- a receive hybrid circuit connected to receive signals from the first and second antennas, and to output a sum of the signals from the first and second antennas, and to output a difference of the first and second antenna signals;
- a first cancellation circuit connected to receive the first transmit signal and configured to compensate for an interference due to a first transmit path;
- a second cancellation circuit connected to receive the second transmit signal and configured to compensate for an interference due to a second transmit path;
- wherein:
- the sum output of the receive hybrid circuit and the output of the first cancellation circuit are combined to generate a first receive signal; and
- the difference output of the receive hybrid circuit and the output of the second cancellation circuit are combined to generate a second receive signal.

2. The MIMO antenna arrangement of claim 1 wherein each of the first and second cancellation circuits include a phase inverter, wherein respective sum and difference outputs of the receive hybrid circuit are combined with inverse outputs of the respective first and second cancellation circuits.

3. The MIMO antenna arrangement of claim 1 wherein each of the first and second cancellation circuits include a sub-canceller circuit for matching an impedance of a respective first and second antenna.

4. The MIMO antenna arrangement of claim 1 further comprising:
- a first transmit filter connected between the sum output of the transmit hybrid circuit and the first antenna;
- a second transmit filter connected between the difference output of the transmit hybrid circuit and the second antenna;
- a first receive filter connected between the first antenna and the receive hybrid circuit; and
- a second receive filter connected between the second antenna and the receive hybrid circuit.

5. The MIMO antenna arrangement of claim 4 wherein the first and second transmit filters and the first and second receive filters are variable filters.

6. The MIMO antenna arrangement of claim 4 wherein, the first cancellation circuit includes:
- a first cancellation receive filter connected to receive the first transmit signal; and
- a first cancellation transmit filter connected to receive a signal from the first cancellation receive filter;

the second cancellation circuit includes:
- a second cancellation receive filter connected to receive the first transmit signal; and
- a second cancellation transmit filter connected to receive a signal from the second cancellation receive filter.

7. The MIMO antenna arrangement of claim 6 wherein the first cancellation circuit comprises a 180° phase shift circuit, and the second cancellation circuit includes a 180° phase shift circuit.

8. The MIMO antenna arrangement of claim 6 wherein the first and second cancellation transmit filters and the first and second cancellation receive filters are variable filters.

9. The MIMO antenna arrangement of claim 6 wherein the first transmit filter matches the first cancellation transmit filter, the second transmit filter matches the second cancellation transmit filter, the first receive filter matches the first cancellation receive filter, and the second receive filter matches the second cancellation receive filter.

10. The MIMO antenna arrangement of claim 6 wherein each cancellation circuit includes a sub-canceller connected between the respective cancellation transmit and cancellation receive filters.

11. The MIMO antenna arrangement of claim 10 wherein each sub-canceller circuit is a variable impedance network.

12. The MIMO antenna arrangement of claim 10 wherein the sub-canceller circuit is adjustable to match an impedance of a respective first or second antenna.

13. The MIMO antenna arrangement of claim 10 wherein each sub-canceller circuit is adjustable to compensate for an interference in a respective receive path from a respective transmit path.

14. The MIMO antenna arrangement of claim 1 wherein the transmit hybrid circuit includes:
- a first transmit filter for filtering the sum output of the transmit hybrid circuit;
- a second transmit filter for filtering the difference output of the transmit hybrid circuit;
- and the receive hybrid circuit includes:
- a first receive filter for filtering the first antenna signal; and
- a second receive filter for filtering the second antenna signal.

15. The MIMO antenna arrangement of claim 1 further comprising:
- a first circulator connecting the first antenna, the sum output of the transmit hybrid circuit, and an input to the receive hybrid circuit; and
- a second circulator connecting the second antenna, the difference output of the transmit hybrid circuit, and an input to the receive hybrid circuit.

16. The MIMO antenna arrangement of claim 1 further comprising:
- a first low noise amplifier for receiving the first receive signal;
- a second low noise amplifier for receiving the second receive signal;
- a first power amplifier for providing the first transmit signal; and
- a second power amplifier for providing the second transmit signal.

17. A method of transmitting and receiving in a multiple input, multiple output, MIMO, antenna arrangement, the method comprising:
- receiving first and second transmit signals;
- outputting a sum of the first and second transmit signals to a first antenna;

outputting a difference of the first and second transmit signals to a second antenna;

receiving first and second signals from the first and second antennas in first and second receive paths;

outputting a sum of the signals received from the first and second antennas;

outputting a difference of the signals received from the first and second antenna signals;

determining an interference in the first receive path due to the first transmit signal;

determining an interference in the second receive path due the second transmit signal;

combining the sum output of the signals received from the first and second antennas and an inverse of the determined interference in the first receive path due to the first transmit signal to generate a first received signal; and combining the difference output of the signals received from the first and second antennas and an inverse of the determined interference in the second receive path due to the second transmit signal to generate a second received signal.

18. The method of claim 17 wherein the step of determining the interference in the first and second receive paths due the respective first and second transmit signals includes matching an impedance of a respective first and second antenna.

19. The method of claim 17 further comprising:

in a first filtering step filtering the sum output prior to the first antenna;

in a second filtering step filtering the difference output prior to the second antenna;

in a third filtering step filtering the signal received from the first antenna; and in a fourth filtering step filtering the signal received from the second antenna, wherein determining an interference in the first receive path due to the first transmit signal includes applying filtering steps equivalent to the first and third filtering steps to the first transmit signal, and determining an interference in the second receive path due to the second transmit signal includes applying filtering steps equivalent to the second and fourth filtering steps to the second transmit signal.

20. The method of claim 17 further comprising applying a 180° phase shift circuit to each of the determined interferences in the first receive path due to the first transmit signal and the second receive path due to the second transmit signal, or to each of the signals in the receive path.

* * * * *